Feb. 14, 1939. C. J. SCHROEDER 2,147,270
APPARATUS FOR LIQUID LEVEL INDICATORS
Filed Dec. 31, 1936
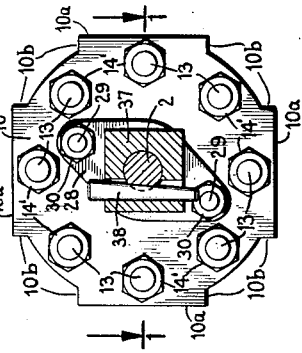
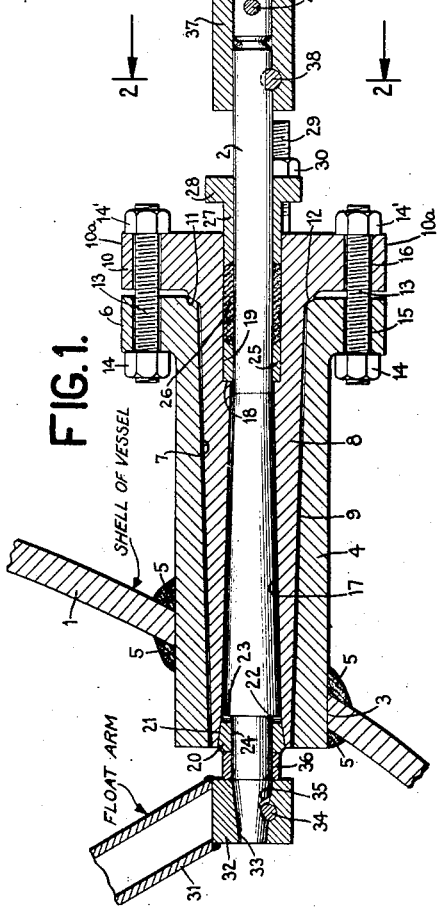
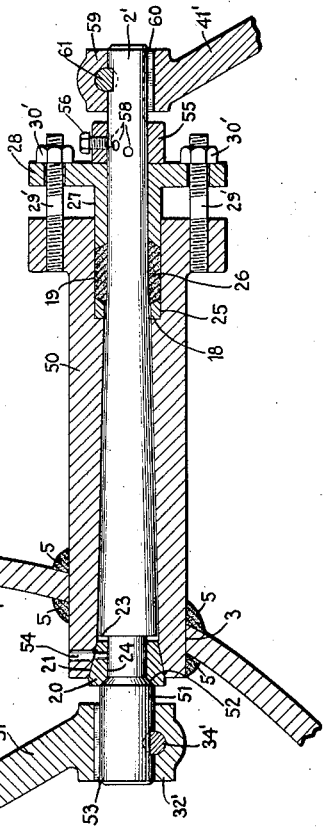
INVENTOR
CARL J. SCHROEDER
BY *Pike & Sullivan*
ATTORNEY Patented Feb. 14, 1939

2,147,270

UNITED STATES PATENT OFFICE 2,147,270

APPARATUS FOR LIQUID LEVEL INDICATORS

Carl J. Schroeder, Hammond, Ind., assignor to Standard Oil Company, Chicago, Ill., a corporation of Indiana Application December 31, 1936, Serial No. 118,561

14 Claims. (Cl. 308—36.2)

My invention relates to a liquid level indicating device and refers in particular to a structure and mechanism for transmitting the motion of a float or the like contained within a vessel maintained under pressure to an indicating device located at the exterior of such vessel.

My invention is applicable to any desired vessel containing any desired liquid therein, but it is especially adapted for use with vessels, such as a cracking still or reaction chamber, wherein oil is maintained under pressure and at a cracking temperature, and particularly in such vessels wherein relatively low liquid level is maintained. The measurement of liquid level in oil cracking vessels, or the like, has always been difficult because of coking and corrosion of the float and the mechanism for transmitting the motion of the float to an indicator positioned exterior of the vessel, and has been particularly difficult in the case of such vessels wherein a low liquid level is maintained in view of the limited amount of space available for operation of the float in the lower portions of the vessel, the high temperature of the oil, the fact that a harder and greater quantity of coke is deposited on the float and mechanism operated thereby, and because of a more violent agitation of the oil undergoing treatment.

The formation and deposition of coke upon the float and the mechanism for transmitting the motion of the float to the indicating device on the exterior of the vessel greatly impair the sensitivity and accuracy of the indicating device, and if sufficiently bad may cause a shutdown of the apparatus and the process being carried out therein, particularly in the case of a low liquid level process wherein it is desirable to permit only small variations in the level of the oil in the stills or the like. To assist in preventing excessive coking of the float and shaft connected thereto it is customary for the operator to manually operate such shaft from the outside of the vessel and strike the float against the wall of the vessel to free the float of coke deposited thereon and prevent sticking of the shaft. Such procedure often causes breakage of the shaft and a consequent shutdown of the apparatus and processes being carried on therein.

In the past, shutdown for any of these reasons has been costly, not only because of the expense involved in stopping and starting up the process in operation, but also because the structure of the liquid level mechanism has been such that the disassembly, repair, and reassembly thereof is difficult and time consuming, particularly when such mechanism is badly coked, as is usualy the case. In view of such difficulty and expense it is also customary to disassemble and clean the indicating mechanism only upon every second or third shutdown of the apparatus for reasons other than coking of the liquid level mechanism. It would be desirable, however, to disassemble and clean this mechanism every time that the apparatus is shutdown for such other reasons to prevent the impairment of the sensitivity and accuracy of the indicating mechanism due to the deposition of coke thereon and to prevent or minimize the danger of future shutdown of the apparatus due to coking difficulties in the indicating mechanism.

It is an object of my invention to provide a structure and mechanism for transmitting the motion of a float, or the like, on the interior of a vessel to an indicating device on the exterior of the vessel which obviates or reduces these difficulties, and which is simpler in structure and less expensive to construct, repair and maintain than that previously used for this purpose. It is a further object of my invention to provide in a device of the type described a structure which may be easily and quickly disassembled, even although badly coked, repaired or cleaned, and reassembled again. It is a particular object of my invention to provide a mechanism of this character which, because of the ease with which it may be disassembled and reassembled even though badly coked, will permit inspection and cleaning of the mechanism every time the process is shutdown, rather than every second or third time, as in the past, and thereby increase the sensitivity and accuracy of the device during constant use thereof and decrease the likelihood of shutdown due to coking of the indicating mechanism. It is a further object of my invention to increase the sensitivity and accuracy of the indicating mechanism by providing a structure which becomes less easily coked and which is more readily adapted to be freed of coke by manual means exterior of the vessel without shutting down the apparatus. It is also an object of my invention to provide a structure which, in addition to the above, also prevents the shaft from blowing out of the vessel in the event of breakage of the shaft while the vessel is under pressure.

Other objects and advantages reside in the structure, arrangement and combination of parts hereinafter described and illustrated in the drawing in which like reference numerals refer to like parts in the several views, and Fig. 1 shows a horizontal cross section of my improved structure and mechanism taken on the line 1—1 of Fig. 2;

Fig. 2 is a view partly in elevation and partly in section taken on the line 2—2 of Fig. 1, and Fig. 3 is a view similar to Fig. 1 illustrating a modified form of my invention.

Referring to the drawing and particularly to Fig. 1, the reference character 1 indicates a fragmentary section of the shell of a vessel which may be a container of any desired shape and used for any desired purpose, but which is preferably a vessel wherein a low liquid level of oil is maintained under relatively high pressure and at a cracking temperature. A shaft 2 extends from the interior of said vessel to the exterior thereof through a hole 3 in the shell 1 of the vessel. An elongated housing or nozzle 4 is provided for the shaft, and is secured to the wall 1 at the opening 3 therein with a pressure-tight seal provided by any suitable means such as welding, as indicated at 5. The housing 4 extends into the vessel through the opening 3 for a portion of the length of the shaft contained within the vessel, and is provided with a flange 6 at the end thereof outside of the vessel. The hollow interior or bore of the housing 4 is made circular and of uniformly increasing diameter throughout its length to provide a surface 7 which tapers outwardly from the end of the housing within the shell 1 to the end thereof at the flange 6. A sleeve or bonnet 8 is adapted to fit within the housing 4 and is provided with an exterior surface 9 which has a tapered surface complementary to the tapered interior surface 7 of the housing 4 to provide a relatively close fit between the housing and bonnet when the latter is in place. The surfaces 7 and 9 are provided with a smooth machine finish to provide a smooth fit between the bonnet and housing and at the same time permit a ready insertion and removal of the bonnet into and out of the housing. A small clearance of 1/16 inch, more or less, may be provided between the surfaces 7 and 9 to assist in such insertion and removal. The bonnet 8 is provided with a flange 10 at the end thereof exterior of the vessel and adjacent the flange 6. The flange 10 is made relatively heavy and is formed with laterally extending bosses or lugs 10a, best shown in Fig. 2, to provide shoulders 10b adapted to be struck sharp blows with a hammer or the like to loosen the bonnet from the housing 4 in the event of coking or corrosion between these two members. An annular inclined shoulder 11 is provided on the inside face of the flange 10 at the junction of said flange and the outside inclined surface 9 of the bonnet and is adapted to engage a similarly inclined surface 12 on the flange 6. The inclined annular surface of the shoulder 11 and the surface 12 are lap ground to provide a pressure-tight seal between the bonnet and housing 4 when the bolts 13 and nuts 14 or 14' are tightened. The shoulder 11, by engaging the surface 12, also prevents the bonnet from becoming wedged within the housing 4 when these bolts and nuts are tightened. The bolts 13 pass through elongated openings 15 and 16 in the flanges 6 and 10, respectively, and by tightening the nuts 14 or 14' securely attach the bonnet to the housing as well as provide the pressure-tight seal aforementioned.

The interior or bore of the sleeve or bonnet is made circular in cross section and is provided for a greater portion of its length beginning at the end thereof within the vessel 1 with a tapered surface 17 having a slope opposite in direction to that of the external surface 9 of the bonnet. The interior surface of the bonnet is cut away at the end thereof adjacent the flange 10 to provide a shoulder 18 and an enlarged bore 19 of circular cross section and constant diameter. The surfaces 17 and 19 are given a smooth machine finish.

A tapered bushing 20, which may be split or of one piece, is adapted to fit within the bonnet 8 at the end thereof within the vessel and engage the tapered surface 17 of the bonnet. If desired, the surface of the bonnet within which the bushing 20 fits may be given a taper of greater slope than that of the remainder of the surface 17, as illustrated at 21.

The portion of the shaft which is contained within the tapered surface 17 of the bonnet between the bushing 20 and the shoulder 18 is provided with a tapered surface complementary to and adapted to cooperate with the surface 17 and prevent removal of the shaft from the flanged end of the bonnet while permitting free rotation of the shaft 2 within the bonnet. A portion of the shaft normally contained within the vessel end of the bonnet is cut away at 22 to provide a shoulder 23 and a portion of smaller diameter 24 adapted to fit within the bushing 20. The bushing 20 serves as bearing for the shaft at its end within the vessel. The portion of the shaft from a point adjacent the shoulder 18 on the bonnet 8 to the end thereof exterior of the vessel is made of constant diameter.

A stuffing box bushing 25 is adapted to fit around the shaft within the enlarged portion 19 of the bonnet and rests against the shoulder 18 of the bonnet at its inner edge. Packing 26 of any suitable material is adapted to fit around the shaft 2 within the enlarged portion 19 of the bonnet, and is clamped between the stuffing box bushing 25 and a packing gland 27 adapted to fit around the shaft 2 and extend within the portion 19 of the bonnet. The gland 27 is provided with a diamond-shaped flange 28, best shown in Fig. 2, at the exterior end thereof. Studs 29 screw into tapped holes in the flange 10 and project through the flange 28 of the packing gland. Nuts 30 engage the threads on the studs and provide means for adjustably forcing the packing gland against the packing material 26 to provide the desired pressure-tight fit around the shaft 2.

An arm 31, adapted to be attached to a float or the like (not shown), is secured to a hub 32 by suitable means such as welding, and the hub 32 is mounted on the end of the shaft 2. Since this portion of the mechanism is subjected to considerable coking and corrosion the shaft and hub may be provided with a taper 33 to assist in removing the hub from the shaft and in providing a tight fit between the hub and shaft. A wedge key 34 passes through a drilled hole in the hub 32 and engages the notch 35 in the shaft 2 to secure the hub upon the shaft and prevent relative rotation between the shaft and hub. A thrust collar 36 is provided between the bushing 20 and hub 32.

A coupling 37 fits over the end of the shaft 2 exterior of the vessel and is secured to said shaft by means of the wedge key 38. A short shaft 39 fits within the other end of the coupling and is secured thereto by means of the shear pin

40. An arm 41, which may be in the form of a hollow pipe, is rigidly connected to the outside end of the shaft 39 by any suitable means such as welding. The arm 41 may be provided with the usual counterweights and a handle for manually rotating the shaft 2 (not shown) and serves as an indicator of the liquid level within the vessel, or may operate any desired indicating mechanism (also not shown) for this purpose.

All parts except the packing material 26, the housing or nozzle 4, the packing gland 27 and the various screw elements are preferably made from stainless steel to minimize corrosion difficulties and avoid frequent replacement of parts. The housing 4 may be made from 0.20–0.30 carbon steel and the packing gland 27 from forged steel. The screw parts may be standard steel screw elements. The packing 26 may be composed of any suitable materials such as copper and graphite.

In operation the free end of arm 31 is moved up and down by means of a float or similar device adapted to rise and fall with the level of the liquid contained in the vessel 1, and such movement of the arm causes a rotation of shaft 2 by means of hub 32 and wedge key 34. The rotation of shaft 2 is transmitted to shaft 39 through the wedge key 38, coupling 37 and shear pin 40, and this in turn causes a movement of the counterweight arm 41 corresponding to the movement of arm 31 within the vessel. The arm 41 may itself serve as an indicator of the liquid level, or may serve to operate any desired indicating device, either electrical or mechanical, and thereby indicate the level of the liquid within the vessel 1.

The internal pressure of the vessel 1 acting upon hub 32 and shaft 2 is transmitted to the tapered bushing 20 through the thrust collar 36 and thereby wedges said collar into the bonnet 8 to provide a tight seal between the bushing and bonnet and prevent the entrance of vapors or liquid into the space between the shaft 2 and bonnet 8. This pressure also tends to wedge the hub 32 upon the tapered shaft 2, and to provide a tight joint between the faces of the thrust collar 36 and the hub 32 and bushing 20, respectively, and thereby tends to prevent entrance of vapors or liquid oil at these points. By thus preventing the vapors or liquid oil from reaching the surfaces of the shaft 2 the formation of coke or the like on said shaft is materially limited, if not prevented entirely, and thus the free rotation of the shaft is not impaired or prevented by the formation of such coke. The thrust collar 36 at the same time prevents the shaft from being wedged within the bonnet due to the pressure acting on the end of the shaft.

In order to disassemble the device for inspection, cleaning, or repair thereof it is only necessary to remove the hub 32 from the end of the shaft, remove the nuts 14 or 14' and withdraw the bonnet 8 from the housing 4. In the event that the hub 32 is coked or corroded to the shaft 2, as is usually the case, the taper 33 assists in the removal of the hub from the shaft. The tapered joint between the surfaces 7 and 9 of the housing and bonnet permits ready withdrawal of the bonnet from the housing even though such surfaces are coked or corroded, and the bonnet, shaft, bushing and thrust collar may be withdrawn as a unit through the bore of the housing 4 to the outside of the vessel 1. It is thus apparent that the only operation required within the vessel itself is the removal of the hub 32 from the shaft, and the remainder of the mechanism is immediately available outside of the vessel for the necessary work thereon. In the event that the bonnet is coked or corroded to the housing 4 between the surfaces 7 and 9 the lugs or bosses 10b on the flange 10 may be given one or more sharp blows with a hammer or the like to readily loosen these parts.

To remove the shaft from the bonnet it is only necessary to loosen the packing gland and give the shaft one or more sharp blows on the end thereof which is normally outside of the vessel. The taper on the shaft permits the shaft to be readily loosened and withdrawn from the bonnet even though the surface between the shaft and bonnet is badly coked or corroded and the shaft is frozen within the bonnet. The shoulder 23 at the other end of the shaft forces the bushing 20 out of the bonnet 8, and the tapered surface 21 permits the bushing to be thus readily removed although it may be badly coked or corroded at 21. The shaft may then be withdrawn through the end of the bonnet which is normally within the vessel, the thrust collar and bushing removed therefrom, and any or all parts cleaned, repaired or renewed without difficulty and within a short period of time. The taper on the external surface of the bushing has an additional function in that it permits a new bushing, or a cleaned bushing, to fit tightly within the end of the bonnet although the surface 21 of the bonnet may have become enlarged because of corrosion or the like. To reassemble the device the reverse procedure is followed.

By means of the coupling 37 and wedge key 38 the counterweight arm and indicating device may be readily disconnected from the shaft 2 to permit the above-described disassembly of the device, and may be readily connected to the shaft again after the reassembly.

Breakage of the shaft within the bonnet 8 or within the vessel 1 would occur at the reduced portion 24 thereof, and a replacement shaft could be readily and quickly installed in the manner hereinabove described. It is also evident that since the breakage would occur at the reduced portion 24 of the shaft one workman could be removing the bonnet and the major portion of the broken shaft from outside of the vessel while another is removing the broken end of the shaft from the hub 32 within the vessel. In the event of breakage of the shaft at this point the pressure within the vessel 1, which would normally tend to blow the shaft out of the bonnet, will merely cause it to wedge against the internal tapered portion of the bonnet and thereby prevent further movement in an outward direction of the shaft. In this manner the taper on the shaft not only permits a ready loosening and withdrawal of the shaft from the bonnet, even though the shaft is body coked, but also prevents the danger of the shaft blowing out of its casing without the necessity of providing a yoke, or the cost in time and material of machining the shaft down to provide a collar thereon, for this purpose.

It is also evident that if the shaft 2 became stuck because of coking or the like and the operator attempted to free the same by manual operation of the counterweight arm, the shear pin 40 rather than the shaft 2 would give way and thereby prevent breakage of the shaft. The wedge key 38 and coupling 37 could then be removed and the shaft given a few sharp blows on the end thereof to loosen it from the bonnet and permit further operation thereof without the necessity of shutting down the apparatus. If this were not satisfactory to free the shaft and disassembly of the device is required for this purpose, it will only be necessary to clean the shaft and bonnet, and the cost of a new shaft is avoided.

It is thus apparent that I have provided a device which is simple in structure and effective in operation, which may be readily maintained in proper working order, and which may be readily disassembled and reassembled whenever desired or necessary with very little work within the vessel.

In Fig. 3 I have shown a modified form of my device in which certain of the refinements and advantages of the structure illustrated in Fig. 1 are omitted but which may be found satisfactory in a number of cases. In this device the separate nozzle 4 and bonnet 8 have been replaced by a single combined housing and bonnet 50. The housing 50 is welded or otherwise suitably secured to the vessel 1 at the opening 3, and the interior surface of this housing is provided with a taper corresponding to the taper 17 on bonnet 8 in Fig. 1, the taper being complementary to the taper on the shaft 2'. In this modification I have shown that the taper on the shaft may be extended somewhat beyond the shoulder 18 of the bonnet, if desired. The packing around the shaft at the end of the bonnet exterior of the vessel is tightened by means of the packing gland 27, flange 28 and suitable studs 29' and nuts 30', as in Fig. 1.

In this figure the thrust collar 36 has been replaced by a portion 51 of enlarged diameter at the end of the shaft 2' normally within the vessel. The shoulder 52 provided by the junction of the enlarged portion 51 with the reduced portion 24 of the shaft may be bevelled or rounded, if desired, and serves the same functions as does the thrust collar 36 in Fig. 1.

The float arm 31' is shown as being integral with the hub 32', and the hub is keyed to the shaft at 53 as well as maintained thereon by the wedge key 34'. If desired, the end portion of the shaft 2' within the hub 32' may be of reduced diameter, and only an enlarged collar-like portion provided on the shaft between the hub and bushing 20 to provide the shoulder 52. With the shoulder 52 made integral with the shaft it is evident that a split bushing must be used for the tapered bushing 20.

A pin 54 may be provided to prevent inward movement of the shaft 2' and displacement of the bushing 20 from the bonnet 50 when pressure is released from the interior of the vessel. A collar 55 provided with a set screw 56 may also be provided for this purpose, either with or without the use of such pin. The shaft 2' may be spot drilled at a plurality of successive points along the longitudinal axis of the shaft, as indicated at 58, to receive the end of such screw 56 and at the same time permit adjustment of the collar to suit the gland position.

In this figure the coupling has been omitted and the counterweight arm 41' is provided with a hub 59 fitting directly on the end of the shaft 2' exterior of the vessel 1. The hub 59 may be keyed to the shaft as shown at 60, and a wedge key 61 may be provided to maintain the hub on the shaft.

The operation of the device disclosed in Fig. 3 and the disassembly and reassembly thereof are substantially the same as in the device of Fig. 1 except that here the shaft can only be withdrawn from the bonnet 50 into the interior of the vessel, and the collar 55 as well as the hub 59 must be removed from the exterior end of the shaft. Since the shaft is withdrawn into the vessel it is evident that the hub 32' for the float arm 31' need not be removed from the shaft when the device is disassembled for the purpose of cleaning or repairing parts thereof other than the shaft. Since the shaft and hub 32' may be removed from the inside of the vessel as a unit and separated on the outside of the vessel it is not as essential that the end of the shaft within the hub be tapered as in the device of Fig. 1, and accordingly this portion of the shaft has been shown as of constant diameter in this view. It is evident, however, that this portion of the shaft may be tapered, if desired, as in the device in Fig. 1. If the pin 54 is used the shaft 2' must be given a sufficiently hard blow at the exterior end thereof to cause shoulder 23 to engage the bushing 20 and shear off such pin along the tapered surface 21 when the shaft is removed from the bonnet.

It is also apparent that many of the features shown in the modification of Fig. 3, such, for example, as the shoulder 52 integral with the shaft 2', the shear pin 54, the collar 55, and the hub 59, mounted directly on the exterior end of the shaft 2', could be used with the device disclosed in Fig. 1, and that similar features of the device disclosed in Fig. 1 could be used with that shown in Fig. 3. My invention contemplates any such interchange of elements and structural details.

I also contemplate making the housings 4 and 50 and the bonnet 8 of any desired shapes in transverse cross section, and the term "tubular" as hereinafter used in the claims is intended to cover any such shapes. Unless, however, the internal surface 7 of the housing and the external surface 9 of the bonnet are made circular in cross section, as hereinabove described, the advantageous function of the bosses 10a and shoulders 10b in loosening the bonnet from the housing in the event of coking or corrosion may be lost.

Many other variations and modifications may be made within the spirit and scope of my invention, and only such limitations should be imposed as are indicated in the appended claims.

I claim:

1. In a device for indicating the level of liquid contained in a pressure vessel, the combination which comprises a shaft extending from the interior of said vessel to the exterior thereof through an opening provided in the shell of the vessel, the surface of said shaft for a portion of its length being provided with a taper having its greatest diameter towards the end of the shaft within said vessel, a tubular bonnet for said shaft, means for securing said bonnet to said vessel at said opening and providing a pressure-tight seal between the bonnet and vessel, the interior of said bonnet along the bore thereof being provided with a surface complementarily tapered with respect to the taper on said shaft, packing means cooperating with said bonnet and shaft for preventing loss of pressure from said vessel, and means for normally maintaining a small clearance between the tapered portions of said shaft and bonnet to prevent the shaft from becoming wedged within the bonnet.

2. In a device for indicating the level of liquid contained in a pressure vessel, the combination which comprises an elongated tubular bonnet having a tapered internal surface for a portion of the length thereof, means for securing said bonnet to the shell of said vessel at an opening in said shell, said means providing a pressure-tight seal between the bonnet and vessel, said bonnet being in communication with the interior of said vessel and having the largest diameter of said tapered portion towards the end of the bonnet which opens into the vessel, a shaft rotatably mounted within said bonnet and having a tapered portion along the length thereof complementary to said taper on the internal surface of the bonnet, means providing a bearing for said shaft at one end of said bonnet, packing means cooperating with said shaft at the opposite end of said bonnet for preventing the loss of pressure from said vessel, and means for normally maintaining a small clearance between the tapered portions of said shaft and bonnet to prevent the shaft from becoming wedged within the bonnet in use.

3. In a device for indicating the level of liquid contained in a pressure vessel, the combination which comprises an elongated tubular bonnet having a tapered internal surface for a portion of its length, means for securing said bonnet to the shell of said vessel at an opening in said shell, said means providing a pressure-tight seal between the bonnet and vessel, said bonnet being in communication with the interior of said vessel and having the largest diameter of said tapered portion adjacent the end of the bonnet which opens into the vessel, a shaft adapted to freely rotate within the bore of said bonnet and having a tapered portion along the length thereof complementary to said taper on the internal surface of the bonnet, said shaft having a portion of reduced diameter within the end of the bonnet adjacent the interior of the vessel, a tapered bushing surrounding said reduced portion of the shaft and fitted within the bonnet to provide a bearing for said shaft, packing means cooperating with said shaft at the opposite end of said bonnet for preventing the loss of pressure from said vessel and means on said shaft within the vessel and cooperating with said tapered bushing for normally maintaining a small clearance between the tapered portions of said shaft and bonnet to prevent the shaft from becoming wedged within the bonnet.

4. In a device for indicating the level of liquid contained in a pressure vessel, the combination which comprises an elongated tubular bonnet having a tapered internal surface for a portion of its length, means whereby said bonnet is secured to said vessel, said means providing a pressure-tight seal between the bonnet and vessel, said bonnet being in communication with the interior of said vessel and having the largest diameter of said tapered portion adjacent the shell of the vessel, a shaft adapted to freely rotate within said bonnet and having a tapered portion along the length thereof complementary to said tapered internal surface of the bonnet, said shaft having a portion of reduced diameter adjacent the inner end of the bonnet, a tapered bushing surrounding said reduced portion of the shaft and fitted within the bonnet to provide a bearing for said shaft, packing means cooperating with said shaft at the outer end of said bonnet for preventing the loss of pressure from said vessel, and means comprising a collar on said shaft and cooperating with said bushing for normally maintaining a small clearance between the tapered portions of said shaft and bonnet to prevent the shaft from becoming wedged within said bonnet.

5. In a device for indicating the level of liquid contained in a pressure vessel, the combination which comprises an elongated tubular housing, means for securing said housing to the shell of said vessel and providing a pressure-tight seal between the housing and vessel, said housing being provided with a tapered interior surface converging inwardly towards the end of the housing adjacent the interior of said vessel, a sleeve-like bonnet adapted to fit within said housing and having an exterior tapered surface complementary to the taper on the internal surface of said housing to provide a relatively close fit between the housing and bonnet, means for securing said bonnet to said housing and providing a pressure-tight joint therebetween, a rotatable shaft in said bonnet, means providing a bearing for said shaft at one end of said bonnet, packing means cooperating with said shaft at the opposite end of said bonnet for preventing the loss of pressure from said vessel and means for preventing said shaft from blowing out of said vessel due to pressure within the vessel.

6. In a device for indicating the level of liquid contained in a pressure vessel, the combination which comprises an elongated tubular housing, means for securing said housing to the shell of said vessel at an opening in said shell so that the housing is in communication with the interior of the vessel, said means providing a pressure-tight seal between the housing and vessel, a sleeve-like bonnet adapted to fit within said housing, means for securing said bonnet to said housing and providing a pressure-tight joint therebetween, the internal surface of said bonnet being tapered and having its greatest diameter towards the end of the bonnet adjacent the interior of said vessel, a shaft adapted to freely rotate within said bonnet and having a tapered portion complementary to said taper on the internal surface of the bonnet, means providing a bearing for said shaft at one end of said bonnet, packing means cooperating with said shaft at the opposite end of said bonnet for preventing the loss of pressure from said vessel and means for normally maintaining a small clearance between the tapered portions of said shaft and bonnet to prevent the shaft from becoming wedged within the bonnet.

7. In a device for indicating the level of coking and corrosive liquids contained in a pressure vessel, the combination which comprises an elongated tubular housing, means for securing said housing to the shell of said vessel at an opening in said shell with said housing in communication with the interior of said vessel, said means providing a pressure-tight seal between the housing and vessel, said housing having a tapered internal surface with its smallest diameter towards the end of the housing adjacent the vessel, a sleeve-like bonnet adapted to fit within said housing and having a complementary tapered external surface to provide a relatively close fit between the housing and bonnet, said bonnet having one end thereof extending beyond the end of the housing distant from said vessel and being provided with a laterally extended boss adjacent said end of the bonnet, means for securing said bonnet to said housing and providing a pressure-tight joint therebetween, and a shaft adapted to freely rotate within the bore of said bonnet, said boss being adapted to be struck to loosen the bonnet from said housing when the device is to be disassembled.

8. In a device for indicating the level of coking and corrosive liquids contained in a pressure vessel, the combination which comprises an elongated tubular housing, means for securing said housing to the shell of said vessel at an opening in said shell with said housing in communication with the interior of said vessel, said means providing a pressure-tight seal between the housing and vessel, said housing being provided with a flange at the end thereof distant from said vessel, said housing having a tapered internal surface with its largest diameter towards the end of the housing adjacent said flange, a sleeve-like bonnet adapted to fit within said housing and having a complementary tapered external surface to provide a relatively close fit between the housing and bonnet, said bonnet having one end thereof extending beyond the end of the housing and provided with a flange adjacent the flange on said housing, means cooperating with said flanges for securing the bonnet within the housing, an annular shoulder provided on said bonnet adjacent the flange thereon and a surface on said housing cooperating with said shoulder for providing a pressure-tight seal between the housing and bonnet upon tightening of said securing means.

9. In a device for indicating the level of coking and corrosive liquids contained in a pressure vessel, the combination which comprises an elongated tubular housing, means for securing said housing to the shell of said vessel with said housing in communication with said vessel, said housing having a tapered internal surface with its smallest diameter towards the end of the housing adjacent the vessel, a sleeve-like bonnet adapted to fit within said housing and having a complementary tapered external surface to provide a relatively close fit between the housing and bonnet, means for securing said bonnet to said housing and providing a pressure-tight joint therebetween, a shaft rotatably mounted within said bonnet, said shaft extending into the vessel and having a tapered end portion within the vessel, an arm provided with a hub tapered to fit said tapered end portion of the shaft, and means releasably securing said hub to said shaft for rotation therewith.

10. A liquid level indicating means of the character described including an elongated housing provided with an elongated tapered bore, a sleeve-like bonnet adapted to fit within said bore of the housing and having a complementary tapered external surface to provide a relatively close fit between the housing and bonnet, the tapered surfaces permitting removal of said bonnet from said housing, means for securing said bonnet to said housing, the internal surface of said bonnet being provided with a tapered portion sloping in the opposite direction to the tapered external surface of the bonnet, and a shaft rotatably mounted within said bonnet and having a portion along the length thereof complementarily tapered with respect to said taper on the internal surface of the bonnet, and means whereby a small clearance between the tapered portion of said shaft and the tapered portion of said bonnet is maintained to prevent said shaft from becoming wedged in said bonnet in use.

11. A liquid level indicating means of the character described including an elongated tubular housing provided with an elongated tapered bore, said housing being provided with a tapered internal surface, a sleeve-like bonnet adapted to fit within said housing and having a complementary tapered external surface to provide a relatively close fit between the housing and bonnet, means for securing said bonnet to said housing and providing a seal-tight joint therebetween, the internal surface of said bonnet being provided with a tapered portion sloping in the opposite direction to the tapered external surface of the bonnet, a shaft adapted to freely rotate within said bonnet and having a portion along the length thereof complementarily tapered with respect to said taper on the internal surface of the bonnet, said shaft having a portion of reduced diameter near the end thereof adjacent to the tapered portion having the greatest diameter, a tapered bushing surrounding said reduced portion of the shaft and fitted within said bonnet to provide a bearing for said shaft, packing means disposed in the other end of said bonnet and cooperating with the shaft to provide a pressure-tight seal between said bonnet and shaft and means cooperating with said bushing for normally maintaining a small clearance between the tapered portion of said shaft and the tapered portion of said bonnet to prevent said shaft from becoming wedged in said bonnet.

12. A liquid level indicating means of the character described including an elongated tubular housing provided with an elongated tapered bore a sleeve-like bonnet adapted to fit within said housing and having a complementary tapered external surface to provide a relatively close fit between the housing and bonnet, means for securing said bonnet to said housing and providing a seal-tight joint therebetween, said bonnet having an internal tapered portion sloping in the opposite direction to the tapered external surface of the bonnet, a shaft adapted to freely rotate within said bonnet and having a portion along the length thereof complementarily tapered with respect to said tapered internal surface of the bonnet, said shaft having a portion of reduced diameter near the end thereof adjacent to the tapered portion having the greatest diameter, a tapered bushing surrounding said reduced portion of the shaft and fitted within said bonnet to provide a bearing for said shaft, packing means disposed in the other end of said bonnet and cooperating with the shaft to provide a pressure-tight seal between said bonnet and shaft, an arm provided with a hub secured to the end of said shaft adjacent said bushing and means comprising a thrust collar surrounding said shaft and engaging said bushing and said hub for normally maintaining a small clearance between the internal tapered portion of said shaft and the tapered portion of said bonnet to prevent said shaft from becoming wedged in said bonnet.

13. A liquid level indicating device of the character described including in combination a sleeve-like member having a tapered internal surface, a shaft rotatably mounted therein and having a portion of its surface tapered complementary to the tapered internal surface of said sleeve-like member, and bearing means for said shaft adjacent one end of said sleeve-like member, said device being adapted to be attached to a pressure vessel with the greatest diameter of said shaft near the vessel and the smaller tapering portion away from the vessel whereby the shaft in use will be prevented from being blown out by the pressure in the vessel in case of breakage of the shaft.

14. The combination with a pressure vessel of a liquid level indicator which includes a shaft extending from the interior of said vessel to the exterior thereof through an opening in said vessel, the shaft for a portion of its length having a tapered surface with its greatest diameter adjacent the end of said shaft within said vessel, a tubular member for said shaft within which said shaft is rotatably mounted, and means whereby said tubular member is secured to said vessel, the interior of said tubular member being provided with a tapered surface complementary to the tapered surface on said shaft, said tapered shaft in use being prevented from being blown out by the pressure in said vessel in the event of breakage of said shaft by said tapered interior surface of said tubular member.

CARL J. SCHROEDER.

CERTIFICATE OF CORRECTION.

Patent No. 2,147,270.

February 14, 1939.

CARL J. SCHROEDER.

It is hereby certified that error appears in the printed specification of the above numbered patent requiring correction as follows: Page 3, second column, line 61, for "body" read badly; page 6, second column, line 51, claim 12, strike out the word "internal" and insert the same before "tapered" in line 52, same claim; and that the said Letters Patent should be read with this correction therein that the same may conform to the record of the case in the Patent Office.

Signed and sealed this 23rd day of May, A.D. 1939.

(Seal)

Henry Van Arsdale
Acting Commissioner of Patents.